US012811958B2

(12) United States Patent
Shimizu

(10) Patent No.: US 12,811,958 B2
(45) Date of Patent: Nov. 24, 2026

(54) IMAGE PROCESSING APPARATUS, METHOD FOR CONTROLLING IMAGE PROCESSING APPARATUS, AND COMPUTER READABLE STORAGE MEDIUM

(71) Applicant: CANON KABUSHIKI KAISHA, Tokyo (JP)

(72) Inventor: Shota Shimizu, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 50 days.

(21) Appl. No.: 18/905,952

(22) Filed: Oct. 3, 2024

(65) Prior Publication Data

US 2025/0119440 A1 Apr. 10, 2025

(30) Foreign Application Priority Data

Oct. 6, 2023 (JP) ................................ 2023-174322

(51) Int. Cl.
*H04L 9/40* (2022.01)
*H04L 61/4511* (2022.01)

(52) U.S. Cl.
CPC ...... *H04L 63/1416* (2013.01); *H04L 61/4511* (2022.05)

(58) Field of Classification Search
CPC ............. H04L 63/1416; H04L 63/1425; H04L 63/1466
See application file for complete search history.

(56) References Cited

U.S. PATENT DOCUMENTS

| | | | | |
|---|---|---|---|---|
| 7,853,680 | B2 * | 12/2010 | Phatak | H04L 63/0421 709/227 |
| 10,489,231 | B1 * | 11/2019 | Gabay | G06F 11/0784 |
| 2003/0172163 | A1 * | 9/2003 | Fujita | H04L 67/1001 709/226 |
| 2007/0064617 | A1 * | 3/2007 | Reves | H04L 63/1408 370/252 |
| 2010/0274970 | A1 * | 10/2010 | Treuhaft | H04L 61/4511 711/E12.017 |

(Continued)

FOREIGN PATENT DOCUMENTS

| | | | | |
|---|---|---|---|---|
| CN | 113438332 A | * 9/2021 | | G06F 18/2411 |
| EP | 3354001 B1 | * 11/2019 | | H04L 63/0428 |

(Continued)

OTHER PUBLICATIONS

Zhu et al, Translation of CN 113438332, published: Sep. 24, 2021, 10 pages. (Year: 2021).*

(Continued)

*Primary Examiner* — Ponnoreay Pich
(74) *Attorney, Agent, or Firm* — Canon U.S.A., Inc. IP Division

(57) ABSTRACT

A packet monitoring unit of a multi-function peripheral relays encrypted communication, decrypts encrypted communication data at time of relaying into plain text, detects a failure in name resolution by monitoring, based on contents of the decrypted communication data, communication associated with the communication data, and performs control associated with security measures based on detection of the failure in the name resolution.

10 Claims, 6 Drawing Sheets

(56) References Cited

U.S. PATENT DOCUMENTS

| | | | | |
|---|---|---|---|---|
| 2014/0250524 | A1* | 9/2014 | Meyers | G06F 21/554 726/22 |
| 2016/0359887 | A1* | 12/2016 | Yadav | H04L 63/1425 |
| 2017/0279823 | A1* | 9/2017 | Lin | H04L 63/1416 |
| 2018/0191672 | A1* | 7/2018 | Torres | H04L 67/56 |
| 2019/0188385 | A1* | 6/2019 | Selvaraj | G06F 21/568 |
| 2020/0213266 | A1* | 7/2020 | Sichevoy | H04L 63/20 |
| 2020/0285739 | A1* | 9/2020 | Meyers | H04L 63/1491 |
| 2024/0048576 | A1* | 2/2024 | Boucadair | H04L 63/0236 |
| 2024/0314102 | A1* | 9/2024 | Wang | H04L 61/3025 |
| 2025/0119440 | A1* | 4/2025 | Shimizu | H04L 63/1416 |

FOREIGN PATENT DOCUMENTS

| | | | | |
|---|---|---|---|---|
| JP | 2021184533 | A | 12/2021 | |
| WO | WO-2022143155 | A1 * | 7/2022 | H04L 65/00 |

OTHER PUBLICATIONS

Unknown author, DNS over TLS—Wikipedia, 4 pages, printed: Jan. 9, 2026. (Year: 2026).*

* cited by examiner

IMAGE PROCESSING APPARATUS, METHOD FOR CONTROLLING IMAGE PROCESSING APPARATUS, AND COMPUTER READABLE STORAGE MEDIUM

BACKGROUND

Field of the Disclosure

The present disclosure relates to an image processing apparatus, a method for controlling the image processing apparatus, and a computer readable storage medium.

Description of the Related Art

A Domain Name System (DNS) is a protocol that converts between a name used on the Internet and an Internet Protocol (IP) address (name resolution). In DNS name resolution, communication is performed in plain text. Hence, there is a possibility of tapping at a communication destination and man-in-the-middle attack, and there is a countermeasure technique of using encrypted communication called Domain Name System over Transport Layer Security (DoT or DNS over TLS) communication or Domain Name System over Hypertext Transfer Protocol over Transport Layer Security (DoH or DNS over HTTPS) communication (discussed in Japanese Patent Application Laid-Open No. 2021-184533).

In recent years, there are many incidents using a malicious program called malware to illegally collect information from individuals and companies or demand money. Typically, the malware accesses an external server to download another malware or transmit/receive information. Since such a server for malware is suspended when it is found to be used for an attack, it frequently changes a fully qualified domain name (FQDN) and an IP address. Since the FQDN and IP address of the malware are frequently changed as described above, the malware has a list including a plurality of access destination servers and performs an operation of repeating communication until the DNS name resolution succeeds.

As described above, the malware has a feature of repeating DNS communication, and there is a possible malware countermeasure that focuses on this feature. For example, assumed is a countermeasure that monitors transmission packets, counts failures in the DNS name resolution, and determines that the behavior thereof corresponds to that of malware by detecting a predetermined number or more of failures.

However, if encrypted communication, such as DoT communication and DoH communication, is used in the DNS name resolution, DNS packets are encrypted, and there is a possibility that a malware countermeasure using normal packet monitoring as described above does not function.

SUMMARY

Embodiments of the present disclosure are directed to provision of a mechanism that enables, even in a case where the DNS name resolution is performed with use of encrypted communication, detection of a malicious program, such as malware, based on the DNS name resolution, and appropriate control associated with security measures with little effort.

According to embodiments of the present disclosure, an image processing apparatus capable of performing Domain Name System (DNS) name resolution using encrypted communication is provided, the image processing apparatus comprising, a relay unit configured to relay the encrypted communication between an external system and the image processing apparatus, a detection unit configured to detect a failure in the name resolution by monitoring contents of communication data based on a decryption of the encrypted communication by the relay unit, and a control unit configured to perform control associated with security measures based on detection of the failure in the name resolution.

Further features of the present disclosure will become apparent from the following description of exemplary embodiments with reference to the attached drawings.

DESCRIPTION OF THE EMBODIMENTS

Modes for implementing embodiments of the present disclosure will be described below with reference to the accompanying drawings.

Figure 1:
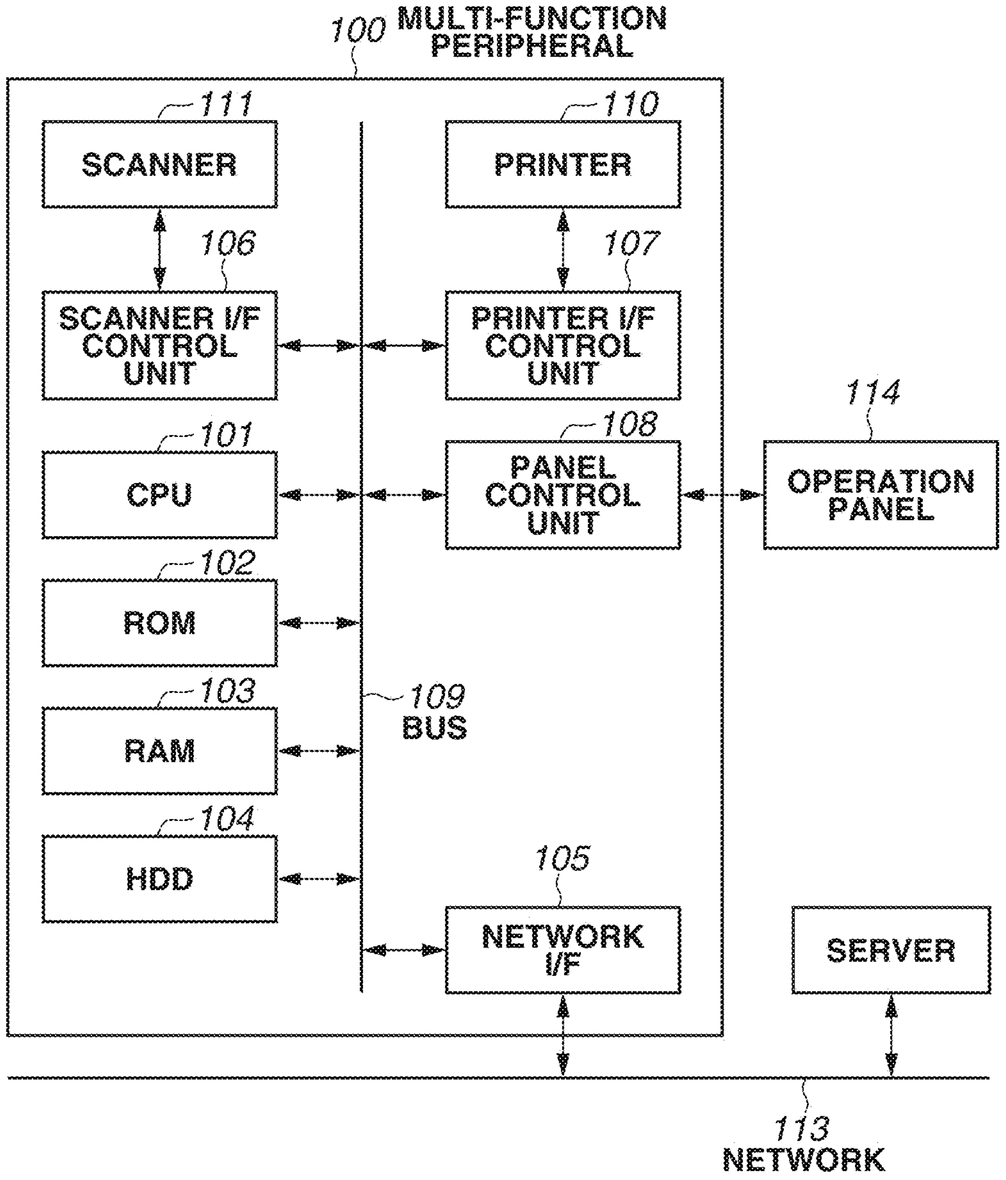
FIG. 1 is a block diagram illustrating an example of a hardware configuration of a multi-function peripheral according to an exemplary embodiment.

FIG. 1 is a block diagram illustrating an example of a hardware configuration of a multi-function peripheral 100 representing one exemplary embodiment of the present disclosure.

The multi-function peripheral 100 is an example of an image processing apparatus representing one exemplary embodiment of the present disclosure. Note that the image processing apparatus according to the present exemplary embodiment includes, in addition to the multi-function peripheral, a print apparatus such as a printer, and an image reading apparatus such as a scanner.

A central processing unit (CPU) 101 executes a software program of the multi-function peripheral 100 and performs control of the whole of the multi-function peripheral 100. A read-only memory (ROM) 102 is a read-only memory in which a boot program is stored. The boot program is a program that is directly read by the CPU 101 first when the multi-function peripheral 100 is powered on, and executed by the CPU 101. A random-access memory (RAM) 103 is a random-access memory that is used for storage of a program, temporary storage of data, and the like when the CPU 101 controls the multi-function peripheral 100.

A hard disk drive (HDD) 104 is a hard disk drive in which a program that is loaded into the RAM 103 by the boot program and executed by the CPU 101 is stored. Additionally, the HDD 104 is used for storage of data necessary for processing performed by the multi-function peripheral 100. Furthermore, a non-rewritable region is prepared in the HDD 104. In the non-rewritable region, a backup of the program is stored. The multi-function peripheral 100 may have a configuration including another storage device, such as a solid-state drive (SSD) and an embedded MultiMediaCard (eMMC), instead of or together with the HDD 104.

A scanner interface (I/F) control unit 106 controls document scanning using a scanner 111.

A printer I/F control unit 107 controls print processing using a printer 110 or another processing.

A panel control unit 108 controls an operation panel 114 of a touch panel type to control display of various kinds of information and input of an instruction from a user.

A network I/F 105 controls transmission and reception of data to and from an external device (for example, a server such as a Domain Name System (DNS) server) through a network 113.

A bus 109 connects the CPU 101, the ROM 102, the RAM 103, the HDD 104, the network I/F 105, the scanner I/F control unit 106, the printer I/F control unit 107, and the panel control unit 108 with one another. A control signal from the CPU 101 and a data signal between apparatuses are transmitted and received via the bus 109.

Figure 2:
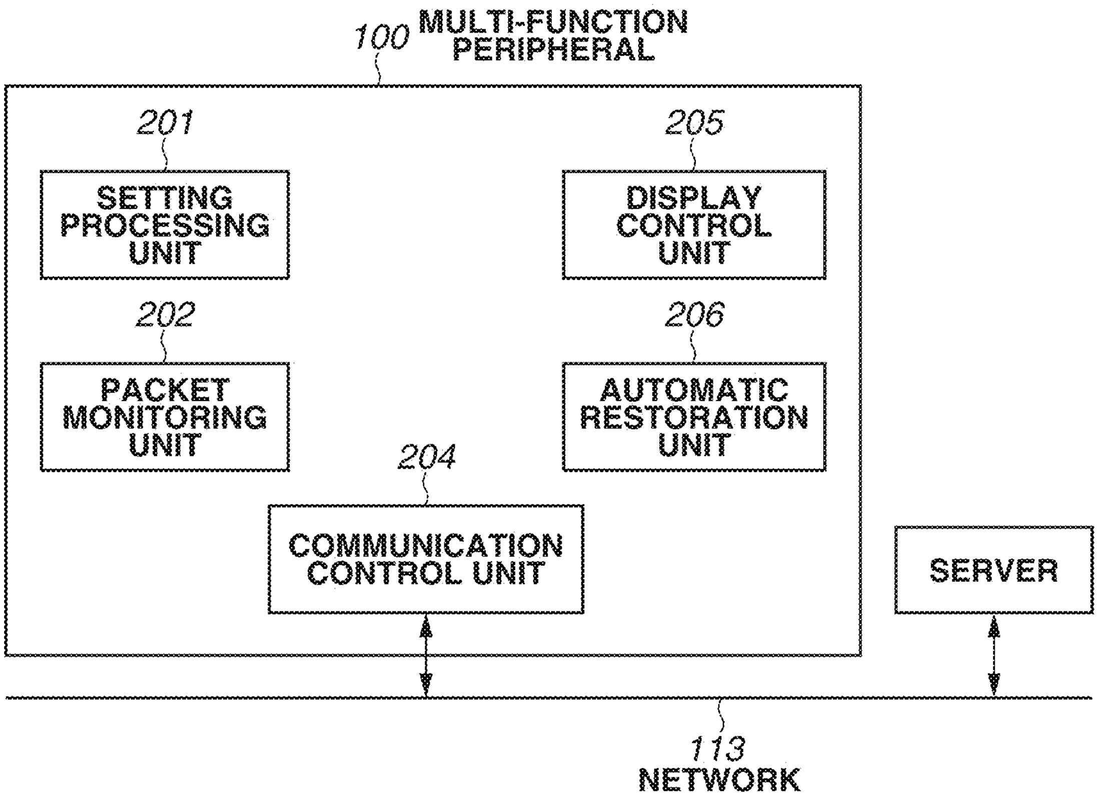
FIG. 2 is a diagram illustrating an example of a software configuration of the multi-function peripheral according to the present exemplary embodiment.

FIG. 2 is a diagram illustrating an example of a software configuration of the multi-function peripheral 100. Assume that all software functions mentioned herein are implemented by the CPU 101 loading a program from the ROM 102 or the HDD 104 into the RAM 103 and executing the program, and a description thereof is omitted below.

A communication control unit 204 uses the network I/F 105 to establish network connection with the network 113 and perform communication with an external device, such as a server (for example, a DNS server). At this time, the communication control unit 204 performs the communication by combining a name resolution protocol, such as the DNS, Domain Name System over Transport Layer Security (DoT or DNS over TLS), and Domain Name System over Hypertext Transfer Protocol over Transport Layer Security (DoH or DNS over HTTPS), and a communication protocol of various kinds, such as Hypertext Transfer Protocol (HTTP) and HTTP over TLS (HTTPS).

A setting processing unit 201 is a software component that performs processing of changing settings of the multi-function peripheral 100. When receiving a setting change instruction from the user via the operation panel 114 and the network I/F 105, the setting processing unit 201 stores settings input by the user in the HDD 104. The other software components use the setting processing unit 201 to read setting values from the HDD 104 and perform processing.

A display control unit 205 performs processing of displaying a screen corresponding to processing of each function on the panel control unit 108 and the operation panel 114.

In a case where execution of a malicious program is detected, an automatic restoration unit 206 deletes all programs stored in a rewritable region of the HDD 104 and performs processing of replacing the programs with a backup program stored in the non-rewritable region of the HDD 104.

A packet monitoring unit 202 monitors packets to be transmitted by the communication control unit 204 to an external apparatus, such as the server (for example, the DNS server) via the network I/F 105, and controls processing of the communication control unit 204 or the like depending on contents of the packets.

In the present exemplary embodiment, a description will be given of an operation performed by the multi-function peripheral 100 in a case where the packets are monitored and an operation of malware is suspected with reference to FIGS. 3A to 3D, and FIGS. 4A and 4B.

FIGS. 3A to 3D are diagrams each illustrating an example of a setting screen of the multi-function peripheral 100.

Figure 4A:
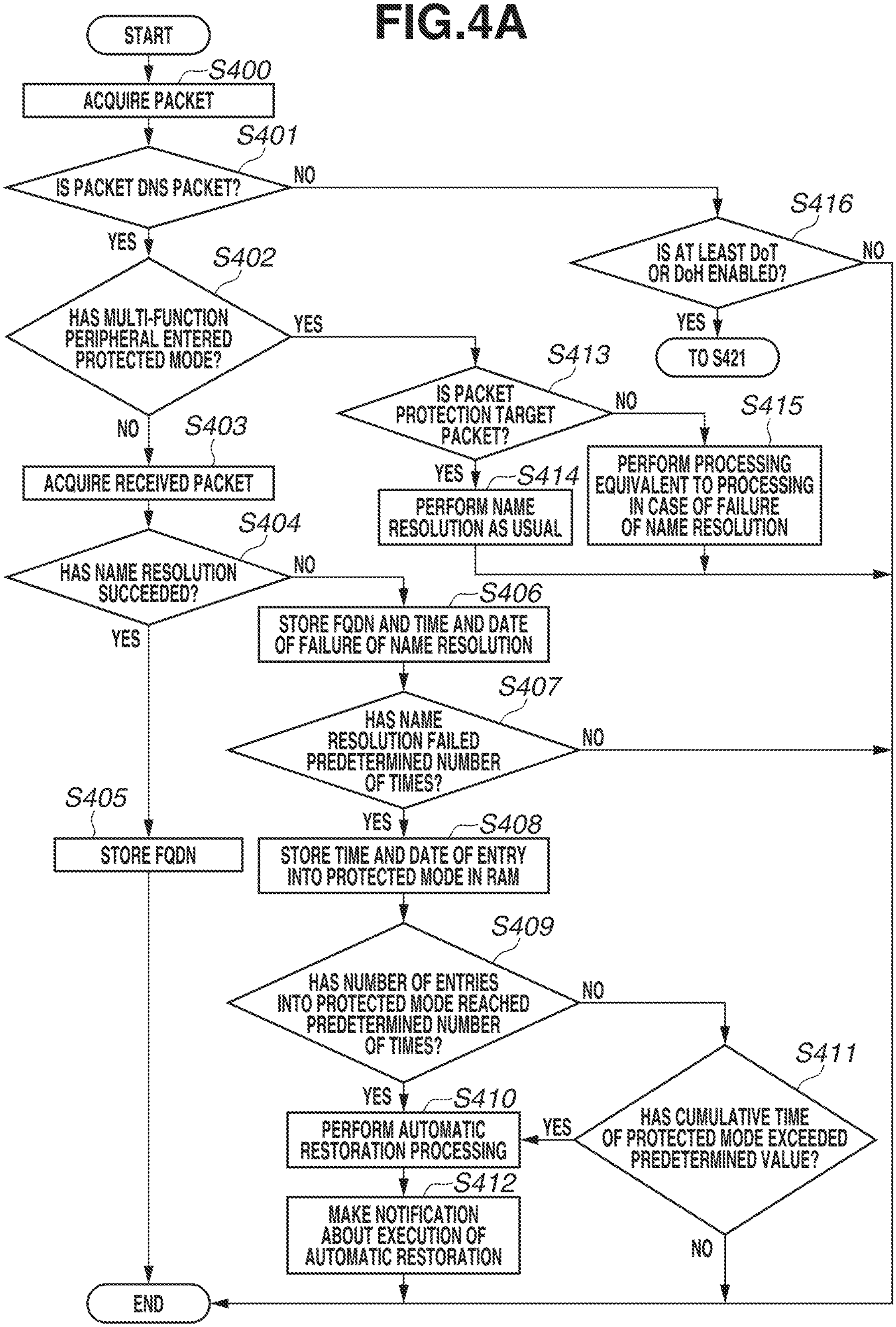
FIG. 4A is a flowchart describing processing performed by the multi-function peripheral according to the present exemplary embodiment.
Figure 4B:
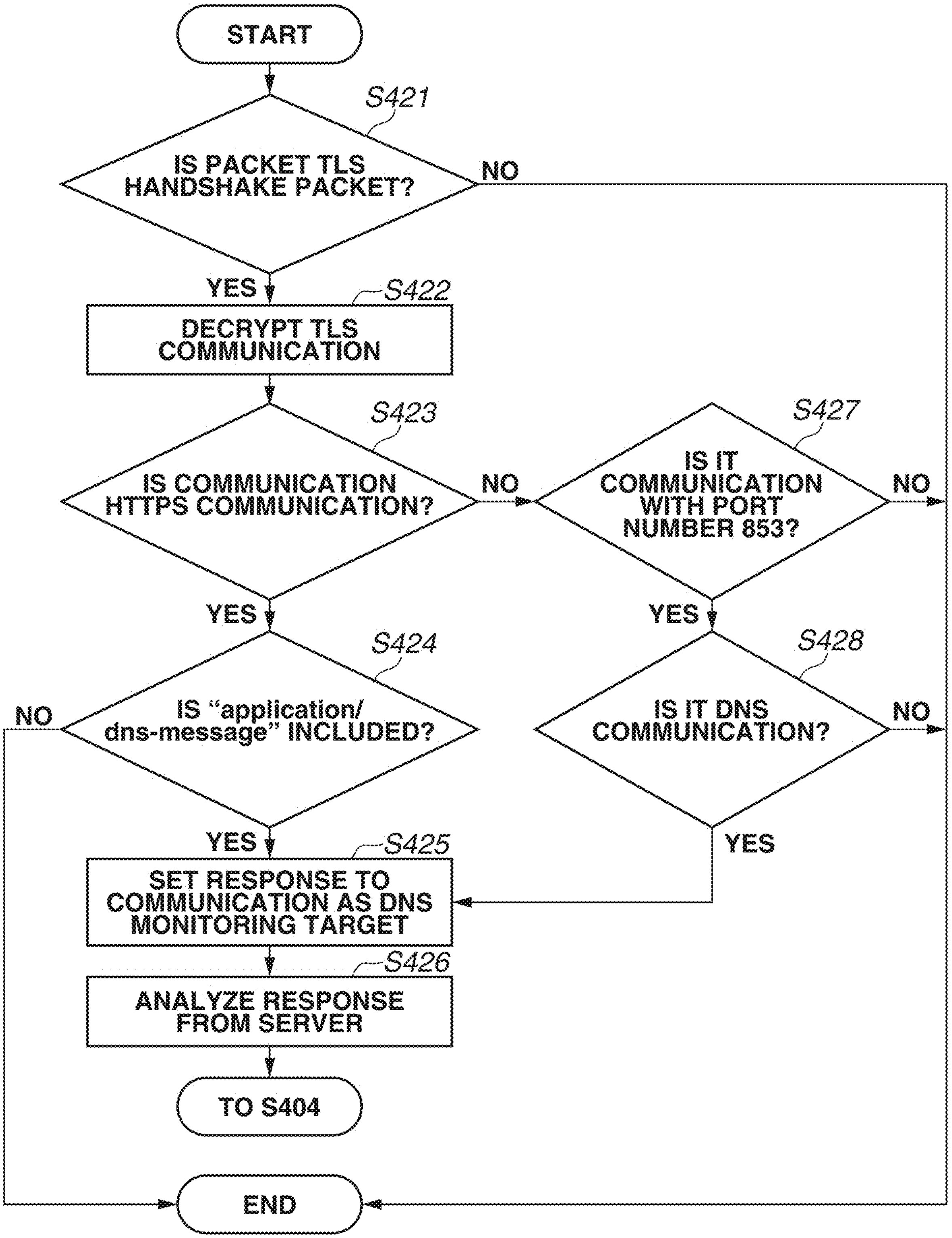
FIG. 4B is a flowchart describing processing performed by the multi-function peripheral according to the present exemplary embodiment.

FIGS. 4A and 4B are flowcharts each describing processing performed by the multi-function peripheral 100 according to the present exemplary embodiment. The processing described in FIGS. 4A and 4B is executed by the software configuration of the multi-function peripheral 100 illustrated in FIG. 2. More specifically, the processing described in these flowcharts is executed by a function implemented by the CPU 101 loading a program from the ROM 102 or the HDD 104 into the RAM 103 and executing the program.

In step S400, the packet monitoring unit 202 acquires a transmission packet when one or another program tries to perform communication with the network 113 via the communication control unit 204.

Subsequently, in step S401, the packet monitoring unit 202 analyzes contents of the packet acquired in above-mentioned step S400 to determine whether the packet is a DNS packet. In a case where the packet is a packet of encrypted communication, such as DoT communication and DoH communication, it is not possible to determine whether the packet is the DNS packet in an encrypted state. Thus, in such a case, assume that the packet monitoring unit 202 determines that the packet is not the DNS packet in the processing in step S401.

In a case where the packet monitoring unit 202 determines that the contents of the packet are not those of the DNS packet (NO in step S401), the processing proceeds to step S416.

Figure 3A:
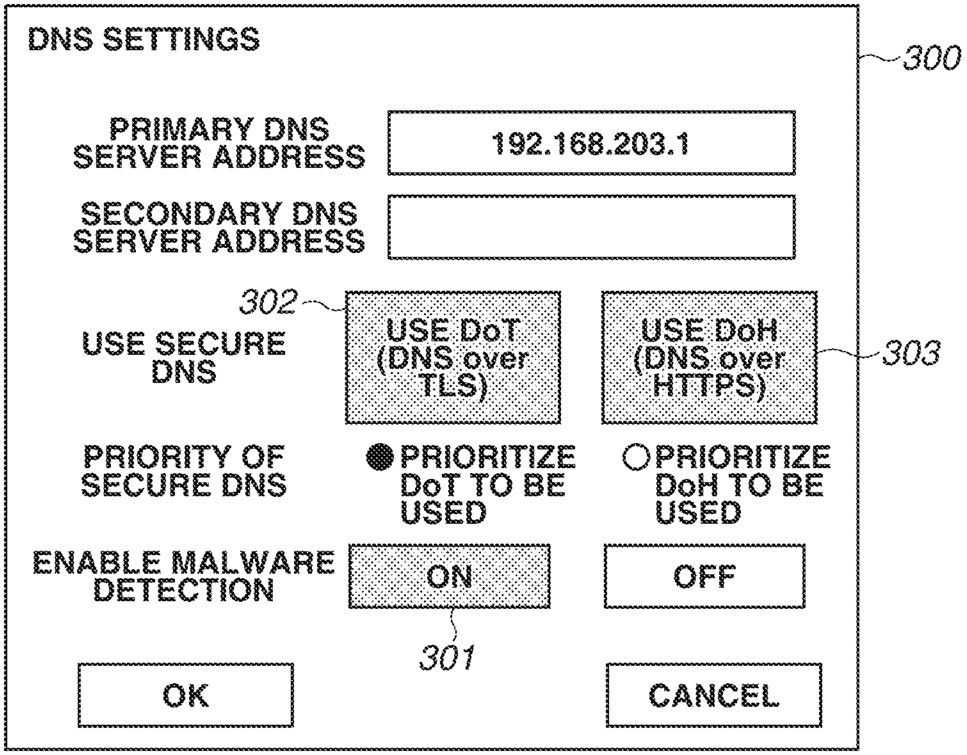
FIG. 3A is a diagram illustrating an example of a setting screen of the multi-function peripheral according to the present exemplary embodiment.
Figure 3B:
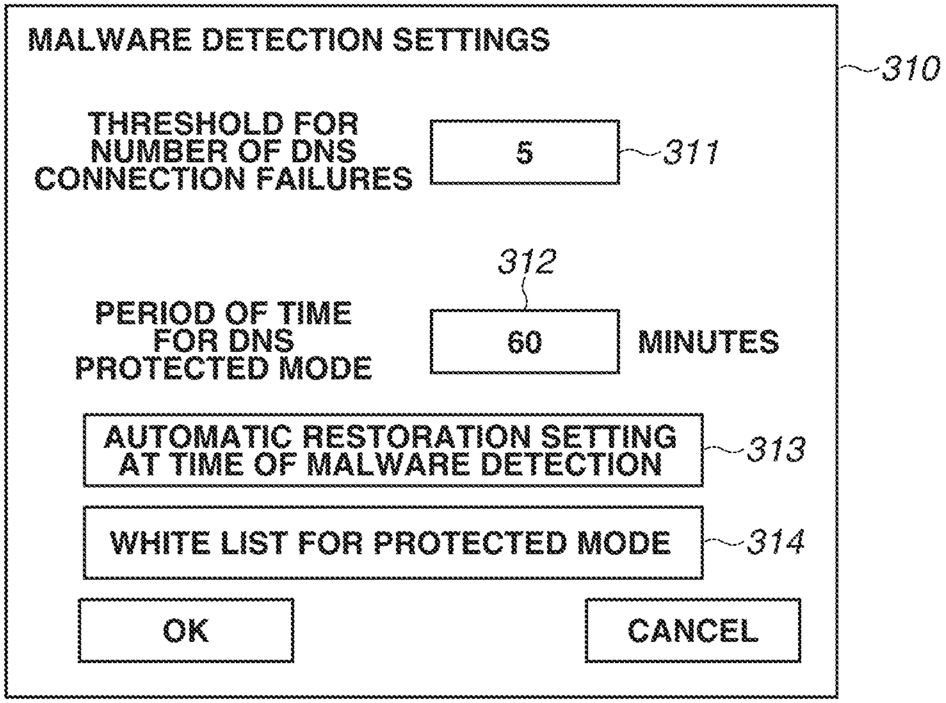
FIG. 3B is a diagram illustrating an example of the setting screen of the multi-function peripheral according to the present exemplary embodiment.

In step S416, the packet monitoring unit 202 determines whether either an item 302 regarding use of DoT (DNS over TLS) or an item 303 regarding use of DoH (DNS over HTTPS) is enabled or both the item 302 and the item 303 are enabled (i.e., whether at least one of the item 302 or the item 303 is enabled) on a screen 300 in FIG. 3A, which will be described below.

In a case where it is determined that neither the item 302 nor the item 303 is enabled (NO in step S416), the packet monitoring unit 202 transmits the packet acquired in above-mentioned step S400 as it is, and ends the processing in the flowchart without checking the contents of the communication.

In contrast, in a case where the packet monitoring unit 202 determines that either the item 302 regarding the use of DoT (DNS over TLS) or the item 303 regarding the use of DoH (DNS over HTTPS) or both the item 302 and the item 303 are enabled (YES in step S416), the processing proceeds to step S421 in FIG. 4B. The processing described in steps S421 to S428 in FIG. 4B corresponds to processing for monitoring DNS packets to take a malware countermeasure even if communication of the transmission packet is the DoT communication or the DoH communication. Details thereof will be described below.

In a case where the packet monitoring unit 202 determines that the contents of the packet are those of the DNS packet in above-mentioned step S401 (YES in step S401), the processing proceeds to step S402.

Subsequently, in step S402, the packet monitoring unit 202 determines whether the multi-function peripheral 100 has entered a protected mode, which will be described below. In the determination, in a case where a predetermined time (a predetermined period of time set in an item 312 in FIG. 3B, which will be described below) has not elapsed from a time and date of entry into the protected mode, the packet monitoring unit 202 determines that the multi-function peripheral 100 has entered the protected mode. The time and date of entry into the protected mode is recorded in the RAM 103 in step S408, which will be described below. In contrast, in a case where the predetermined time has already elapsed from the time and date of entry into the protected mode or in a case where the time and date of entry into the protected mode is not recorded, the packet monitoring unit 202 determines that the multi-function peripheral 100 has not entered the protected mode. Alternatively, in the case where the predetermined time has already elapsed from the time and date of entry into the protected mode, the packet monitoring unit 202 may cancel the protected mode and record a time and date of cancellation of the protected mode in the RAM 103, and make determination about the protected mode based on the time and date of cancellation of the protected mode. The protected mode mentioned herein is an operation mode to forcibly cause the DNS name resolution that does not satisfy a predetermined condition to fail. Details thereof will be described in the following description regarding processing in steps S413, S414, and S415.

In a case where the packet monitoring unit 202 determines that the multi-function peripheral 100 has not entered the protected mode in above-mentioned step S402 (NO in step S402), the processing proceeds to step S403.

In step S403, the packet monitoring unit 202 determines that the communication of the packet acquired in above-mentioned step S400 is communication that is a monitoring target and transmits the packet as it is. If a response is returned to the communication control unit 204, the packet monitoring unit 202 acquires a received packet.

Subsequently, in step S404, the packet monitoring unit 202 analyzes contents of the packet received in above-mentioned step S403 to determine whether the DNS name resolution has succeeded or failed. In a case where the packet monitoring unit 202 determines that the name resolution has succeeded (YES in step S404), the processing proceeds to step S405.

In step S405, the packet monitoring unit 202 stores a fully qualified domain name (FQDN) for which DNS name resolution has succeeded in the RAM 103, and ends the processing in the flowchart.

In contrast, in a case where the packet monitoring unit 202 determines that the name resolution has failed in above-mentioned step S404 (NO in step S404), the processing proceeds to step S406.

In step S406, the packet monitoring unit 202 records a FQDN for which the name resolution has failed and a time and date of the failure in the name resolution in the RAM 103.

Subsequently, in step S407, the packet monitoring unit 202 determines whether the name resolution has failed a predetermined number of times (a threshold set in an item 311 in FIG. 3B, which will be described below) in a predetermined period of time from the FQDN for which the name resolution has failed and the time and date of the failure in the name resolution stored in the RAM 103. In a case where the packet monitoring unit 202 determines that the name resolution has not failed the predetermined number of times in the predetermined period of time (NO in step S407), the packet monitoring unit 202 ends the processing in the flowchart.

In contrast, in a case where the packet monitoring unit 202 determines that the name resolution has failed the predetermined number of times in the predetermined period of time in above-mentioned step S407 (YES in step S407), the processing proceeds to step S408.

In step S408, the multi-function peripheral 100 enters the protected mode, and the packet monitoring unit 202 records the time and date of entry into the protected mode in the RAM 103 (in a case where a time and date of entry into the protected mode has already been recorded, the packet monitoring unit 202 additionally records the time and date instead of overwriting the existing time and date). The protected mode is canceled after the elapse of the predetermined time (the predetermined period of time set in the item 312 in the FIG. 3B, which will be described below) from the above-mentioned time and date of entry into the protected mode, which is recorded in the RAM 103, and the number of failures in the name resolution is recounted from a timing of the cancellation.

Figure 3C:
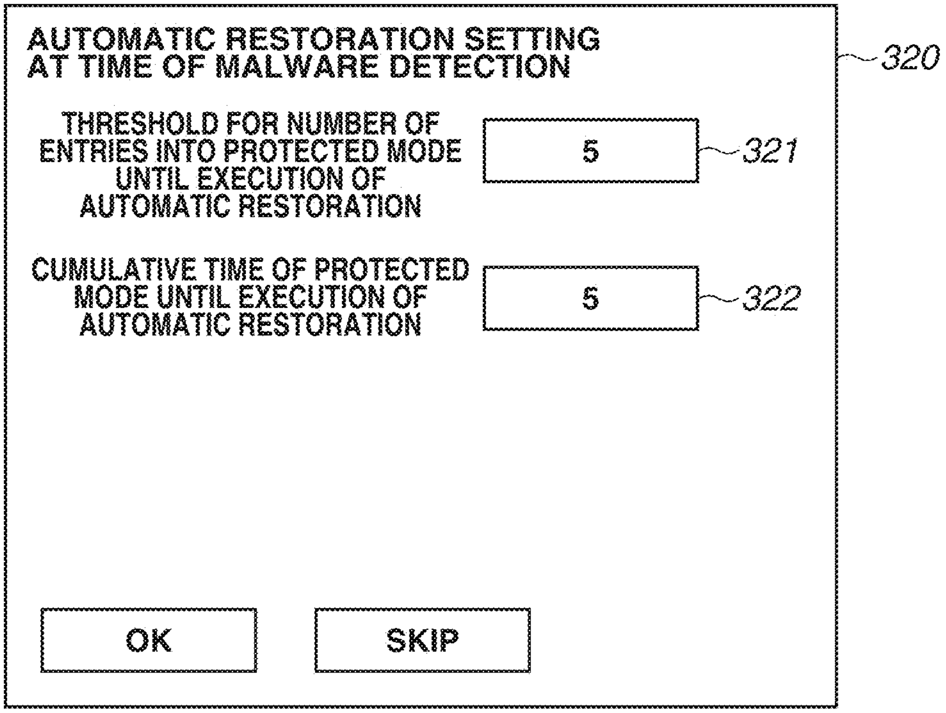
FIG. 3C is a diagram illustrating an example of the setting screen of the multi-function peripheral according to the present exemplary embodiment.
Figure 3D:
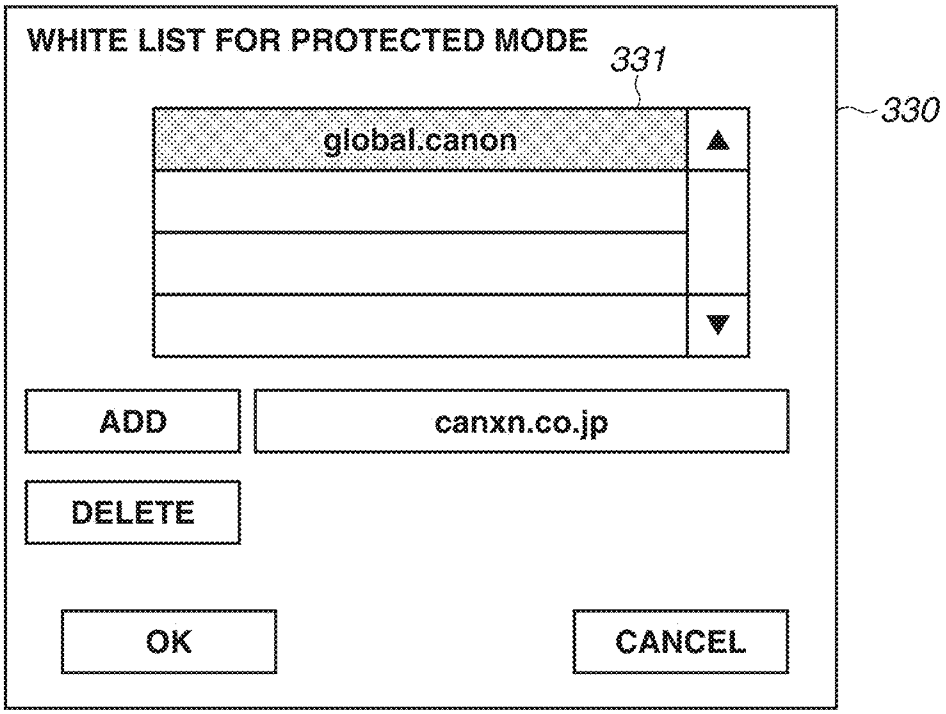
FIG. 3D is a diagram illustrating an example of the setting screen of the multi-function peripheral according to the present exemplary embodiment.

Subsequently, in step S409, the packet monitoring unit 202 counts the number of time and dates of entry into the protected mode having been stored in the RAM 103, and determines whether the multi-function peripheral 100 has entered the protected mode the predetermined number of times (a threshold set in an item 321 in FIG. 3C, which will be described below).

In a case where the number of entries into the protected mode has already reached the predetermined number of times (YES in step S409), the processing proceeds to step S410.

In step S410, the packet monitoring unit 202 performs automatic restoration processing. More specifically, in a case where a situation in which a predetermined number or more of failures in the name resolution is detected (i.e., transition to the protected mode) occurs a predetermined number of times, the packet monitoring unit 202 performs the automatic restoration processing. Specifically, the packet monitoring unit 202 records an automatic restoration instruction in the HDD 104 and restarts the multi-function peripheral 100. When the multi-function peripheral 100 is restarted, the automatic restoration unit 206 determines whether there is the automatic restoration instruction in the HDD 104. In a case where there is no automatic restoration instruction, the automatic restoration unit 206 performs processing of starting the multi-function peripheral 100 as usual. In contrast, in a case where there is the automatic restoration instruction, the automatic restoration unit 206 determines that malware has entered a program stored in the HDD 104 and used for operation of the multi-function peripheral 100 (i.e., the program is infected with a malicious program), initializes the program and a data region, and performs the automatic restoration processing using the backup program recorded in the predetermined non-rewritable region of the HDD 104. After the restoration processing, the automatic restoration unit 206 performs the processing of starting the multi-function peripheral 100 as usual. A series of processes above is the automatic restoration processing performed in step S410. The automatic restoration processing can reliably restore a system suspected of being infected with malware to a state of being not infected with the malware. The automatic restoration processing is not limited thereto and may be other processing as long as it reliably restores a system suspected of being infected with a malicious program such as malware to a state of being not infected with the malicious program such as malware.

After the processing in above-mentioned step S410, in step S412, the automatic restoration unit 206 uses the display control unit 205 to display, on the operation panel 114, a message notifying the user of execution of the automatic restoration processing because of suspected malware infection. The notification is not necessarily the message displayed on the operation panel 114, and may be notification by means of e-mail using the communication control unit 204, or notification by another means such as notification by means of system logging protocol (syslog) transmission to a server that manages the multi-function peripheral 100. The notification allows the user to be aware of a possibility that the multi-function peripheral 100 has been attacked by malware.

After the processing in above-mentioned step S412, the processing in this flowchart ends.

In contrast, in above-mentioned step S409, in a case where the number of entries into the protected mode has not reached the predetermined number of times (NO in step S409), the processing proceeds to step S411.

In step S411, the packet monitoring unit 202 determines whether cumulative time of the protected mode has exceeded a predetermined value (time set in an item 322 in FIG. 3C, which will be described below) based on the time and date of entry into the protected mode, which is stored in the RAM 103, and a present time and date.

In a case where the packet monitoring unit 202 determines that the cumulative time of the protected mode has not yet exceeded the predetermined value (NO in step S411), the packet monitoring unit 202 ends the processing in the flowchart.

In contrast, in a case where the packet monitoring unit 202 determines that the cumulative time of the protected mode has exceeded the predetermined value (YES in step S411), the processing proceeds to step S410.

In a case where the packet monitoring unit 202 determines that the multi-function peripheral 100 has entered the protected mode in above-mentioned step S402 (YES in step S402), the processing proceeds to step S413.

Subsequently, in step S413, the packet monitoring unit 202 determines whether the packet (DNS packet) acquired in above-mentioned step S400 is a protection target packet. For example, in a case where the packet is the DNS packet including a FQDN stored in the RAM 103 in step S405 in previous processing or a FQDN preliminarily registered in a white list for the protected mode (white list for the protected mode set in an item 331 in FIG. 3D, which will be described below), the packet monitoring unit 202 determines that the packet is the protection target packet. As a condition for determining that the packet is the protection target packet, the protection target packet may be a packet other than those exemplified above, such as a packet including a present domain of the multi-function peripheral 100 and a packet including a FQDN that is permitted in another setting. For example, a packet including a domain permitted in cross-origin resource sharing (CORS) may be the protection target packet.

In a case where the packet monitoring unit 202 determines that the DNS packet acquired in above-mentioned step S400 is the protection target packet (YES in step S413), the processing proceeds to step S414.

In step S414, the packet monitoring unit 202 transmits the DNS packet as usual for execution of the name resolution processing without performing processing for a malware countermeasure on the DNS packet, and ends the processing in the flowchart.

In a case where the packet monitoring unit 202 determines that the DNS packet acquired in above-mentioned step S400 is not the protection target packet (NO in step S413), the processing proceeds to step S415.

In step S415, the packet monitoring unit 202 does not transmit the DNS packet and performs processing that is equivalent to processing performed in a case where the communication control unit 204 receives a packet for which the DNS name resolution has failed (perform processing as if the name resolution has failed). In other words, in a case where the predetermined number or more of failures in the name resolution has been detected and the multi-function peripheral 100 has entered the protected mode, the packet monitoring unit 202 restricts (prohibits) execution of the name resolution using communication other than communication that is the protection target, and ends the processing in the flowchart.

A setting screen for performing the processing described in FIG. 4A is now described with reference to FIGS. 3A to 3D.

Screens 300, 310, 320, and 330 are each a setting screen displayed by the display control unit 205 on the operation panel 114 via the panel control unit 108. The multi-function peripheral 100 may have a configuration in which the display control unit 205 is provided with a function of a web server or the like, and the screens 300, 310, 320, and 330 are displayed on a web browser or the like that operates in a client apparatus connected to the multi-function peripheral 100 via a network or the like. By using these screens 300, 310, 320, and 330, contents set by the user from the operation panel 114 are stored in the HDD 104.

The screen 300 is an example of a screen on which DNS settings are made. In a case where "ENABLE MALWARE DETECTION" is set to "ON" as indicated by a button 301 on the screen 300 for DNS settings, the packet monitoring unit 202 executes the processing in FIG. 4A. In a case where "ENABLE MALWARE DETECTION" is set to "OFF", the packet monitoring unit 202 does not execute the processing in FIG. 4A.

The screen 310 is an example of a screen to be displayed in a case where "ENABLE MALWARE DETECTION" is set to "ON" on the screen 300. A value set in the item 311 regarding a threshold for the number of DNS connection failures on the screen 310 is used as the predetermined number of times in the determination processing in step S407 in FIG. 4A. A value set in the item 312 regarding a period of time for the DNS protected mode on the screen 310 is used as the predetermined time in the processing of determining whether the multi-function peripheral 100 has entered the protected mode in step S402 in FIG. 4A.

The screen 320 is an example of a screen to be displayed in a case where an item 313 regarding an automatic restoration setting at the time of malware detection on the screen 310 is selected. A value set in the item 321 regarding a threshold for the number of entries into the protected mode until execution of the automatic restoration processing on the screen 320 is used as the predetermined number of times in the determination processing in step S409 in FIG. 4A. A value set in the item 322 regarding cumulative time of the protected mode until the execution of the automatic restoration processing is used as the predetermined value in the determination processing in step S411 in FIG. 4A.

The screen 330 is an example of a screen to be displayed when a button 314 regarding the white list for the protected mode is selected on the screen 310. A FQDN list (the white list for the protected mode) set on the screen 330 is used as a list of protection target packets in the determination processing in step S413 in FIG. 4A.

Processing in steps S421 to S428 in FIG. 4B executed in a case where the contents of the transmission packet are not the DNS packet is described below with reference to FIG. 4B. The processing corresponds to processing of monitoring DNS packets to take a malware countermeasure even in a case where the name resolution is performed using encrypted communication, such as DoT communication and DoH communication, and is executed in a case where either the item 302 regarding the use of DoT (DNS over TLS) or the item 303 regarding the use of DoH (DNS over HTTPS) is enabled or both the item 302 and the item 303 are enabled.

First, in step S421, the packet monitoring unit 202 determines whether the packet acquired in step S400 in FIG. 4A and determined as not the DNS packet in step S401 is a Transport Layer Security (TLS) handshake packet. TLS handshake is a process of starting a communication session using TLS. Determining whether the transmission packet is the TLS handshake packet enables determination about whether the transmission packet is communication data using the TLS. Both the DoT communication and the DoH communication are communication using the TLS. Thus, in a case where the transmission packet is not the TLS handshake packet, the packet monitoring unit 202 can determine that the communication is neither the DoT communication nor the DoH communication.

In a case where the packet monitoring unit 202 determines that the above-mentioned packet is not the TLS handshake packet (NO in step S421), the packet monitoring unit 202 determines that the communication of the above-mentioned packet is neither the DoT communication nor the DoH communication, and ends the processing in the flowchart.

In contrast, in a case where the packet monitoring unit 202 determines that the above-mentioned packet is the TLS handshake packet (YES in step S421), the processing proceeds to step S422. In this case, there is a possibility that the communication of the above-mentioned packet is either the DoT communication or the DoH communication.

In step S422, the packet monitoring unit 202 behaves as if it is a proxy server (a proxy function), relays the communication, and decrypts communication contents of the above-mentioned packet encrypted by the TLS into plain text.

The proxy function of the packet monitoring unit 202 is now described in detail. When relaying the communication, the packet monitoring unit 202 decrypts a TLS packet once instead of transmitting the TLS packet as it is, recreates a new TLS packet, and causes the communication control unit 204 to transmit the new TLS packet to the server via the network 113. The packet monitoring unit 202 preforms the TLS handshake with the server and holds an encryption key for external communication in the RAM 103. Simultaneously, the packet monitoring unit 202 operates the communication control unit 204 assuming that the multi-function peripheral 100 has received the packet having contents equivalent to those of a response from the server via the network 113. At this time, as a key certificate to be used for TLS encryption inside the multi-function peripheral 100, the multi-function peripheral 100 uses a key certificate held in the HDD 104, and performs the TLS handshake to hold an encryption key for internal communication in the RAM 103. In a case where the multi-function peripheral 100 transmits data to the server, the packet monitoring unit 202 decrypts the contents of the packet with the encryption key for internal communication, and performs processing of re-encrypting the contents of the packet with the encryption key for external communication and transmitting the packet. In a case where the multi-function peripheral 100 receives data from the server, the packet monitoring unit 202 decrypts the received data with the encryption key for external communication, encrypts the data with the encryption key for internal communication, and operates the communication control unit 204 assuming that the multi-function peripheral 100 has received the encrypted data from the server. By executing such processing, the packet monitoring unit 202 is capable of decrypting the contents of communication in above-mentioned step S422 even in the case of TLS communication.

Subsequently, in step S423, the packet monitoring unit 202 analyzes contents of the packet decrypted in above-mentioned step S422 to determine whether the communication is HTTPS communication.

In a case where the packet monitoring unit 202 determines that the communication is the HTTPS communication (YES in step S423), the processing proceeds to step S424.

In step S424, the packet monitoring unit 202 determines whether "application/dns-message" is included in the packet determined as a packet of the HTTPS communication in above-mentioned step S423 as a content type that is interpretable as a response. This is a parameter that must be included in the case of the DoH communication and used for determining whether the communication is the DoH communication.

In a case where the packet monitoring unit 202 determines that "application/dns-message" is included (YES in step S424), the packet monitoring unit 202 determines that the communication of the packet is the DoH communication, and the processing proceeds to step S425.

In step S425, the packet monitoring unit 202 sets a response to the communication of the packet as a DNS monitoring target. Furthermore, in step S426, when the response to the communication of the packet is returned from the server, the packet monitoring unit 202 analyzes contents of the response, and the processing proceeds to step S404 in FIG. 4A. In step S404 in FIG. 4A, the packet monitoring unit 202 determines whether the name resolution has succeeded. Since the processing after a transition to step S404 has been already described with reference to FIG. 4A, the description thereof is omitted here. In a case where the multi-function peripheral 100 has already entered the protected mode at a timing of step S426, the processing may proceed to step S413, not to step S404.

In a case where the packet monitoring unit 202 determines that "application/dns-message" is not included in above-mentioned step S424 (NO in step S424), the packet monitoring unit 202 determines that the communication is neither the DoH communication nor the DoT communication, cancels processing of analyzing contents of transmission/reception of the communication from this point onward, and ends the processing in the flowchart.

In a case where the packet monitoring unit 202 determines that the communication of the above-mentioned packet is not the HTTPS communication in above-mentioned step S423 (NO in step S423), the processing proceeds to step S427.

In step S427, the packet monitoring unit 202 determines whether the communication of the packet is communication with a port number 853. The port number 853 is a number of a port to be used for the DoT communication according to a communication protocol.

In a case where the packet monitoring unit 202 determines that the communication of the above-mentioned packet is not the communication using the port number 853 (NO in step S427), the packet monitoring unit 202 determines that the communication of the packet is neither the DoH communication nor the DoT communication, cancels the processing of analyzing contents of transmission/reception of the communication from this point onward, and ends the processing in the flowchart.

In a case where the packet monitoring unit 202 determines that the communication of the packet is the communication using the port number 853 (YES in step S428), the processing proceeds to step S428.

In step S428, the packet monitoring unit 202 determines whether the communication of the packet is the DNS communication.

In a case where the packet monitoring unit 202 determines that the communication of the packet is the DNS communication (YES in step S428), the packet monitoring unit 202 determines that the communication of the packet is the DoT communication, and the processing proceeds to step S425. More specifically, the packet monitoring unit 202 sets a response to the communication as a DNS monitoring target and analyzes the response from the server, and the processing proceeds to step S404.

In a case where the packet monitoring unit 202 determines that the communication of the packet is not the DNS communication (NO in step S428), the packet monitoring unit 202 determines that the communication of the above-mentioned packet is neither the DoH communication nor the DoT communication, cancels the processing of analyzing contents of transmission/reception of the communication from this point onward, and ends the processing in the flowchart.

As described above, according to the present exemplary embodiment, it is possible to execute malware detection by means of DNS name resolution even in the case of using the DoH function or the DoT function. Although processing similar to the processing according to the present exemplary embodiment can be implemented by preparation of a proxy server, the multi-function peripheral 100 according to the present exemplary embodiment is capable of executing the processing singly, which can save effort of setting the proxy server.

While the description has been given of the determination about the DoT communication through the processing of determining whether the communication uses a specific port number in step S427 in the present exemplary embodiment, malware does not necessarily follow the DoT communication protocol, so that the multi-function peripheral 100 may have a configuration of not performing this processing. In the case of the configuration of not performing the processing, the packet monitoring unit 202 analyzes, for example, communication with all ports to determine whether the communication is the DoT communication. In this case, since the packet monitoring unit 202 analyzes the communication with all the ports, communication speed decreases but security increases. Since there is a trade-off between the communication speed and the security, the multi-function peripheral 100 may have a configuration of prompting the user to make a setting regarding whether to analyze communication with port numbers other than the port number 853 on the operation panel 114.

While the description has been given of the determination about the DoH communication through the processing of determining whether "application/dns-message" is included as the content type in step S424, the determination about the DoH communication is not limited thereto, and another method may be employed.

While the description has been given assuming that the multi-function peripheral 100 has both the DoH function and the DoT function, the present exemplary embodiment can be applied to a multi-function peripheral having only one of the DoH function and the DoT function.

In a case of a multi-function peripheral having only the DoH function, when the communication is determined as not the HTTPS communication in the processing in step S423 in FIG. 4B, the packet monitoring unit 202 can end the processing without performing the processing in step S427. Similarly, in a case of a multi-function peripheral having only the DoT function, the packet monitoring unit 202 can perform the processing in step S427 without performing the processing in step S423 after the processing in step S422.

A method of performing the DNS name resolution to which the present exemplary embodiment can be applied is not limited to the DoH communication and the DoT communication, and may be any method of performing the DNS name resolution using encrypted communication.

While the description has been given of the image processing apparatus, such as the multi-function peripheral, as an example of an apparatus according to the present exemplary embodiment, the present disclosure can be applied to any apparatus that performs the DNS name resolution. For example, the present disclosure can be applied also to various kinds of information processing apparatuses such as a personal computer (PC), a tablet terminal, and a smartphone, and a network device such as a network home electrical appliance.

As described above, according to the present exemplary embodiment, it is possible to execute malware detection based on DNS name resolution even in the case of performing the DNS name resolution using encrypted communication, such as the DoT communication and the DoH communication. Although processing similar to the processing according to the present exemplary embodiment can be implemented by preparation of a proxy server, the multi-function peripheral 100 according to the present exemplary embodiment can execute the processing singly, which can save effort of setting the proxy server. Hence, it is possible to, even in the case of performing the DNS name resolution using the encrypted communication, detect a malicious program such as malware based on the DNS name resolution, and perform appropriate control associated with security measures, such as transition to the protected mode and execution of automatic restoration processing, with little effort.

The above-mentioned configurations and contents of various kinds of data are not limited thereto, and it goes without saying that the data has various configurations and contents depending on intended use and purposes.

While one exemplary embodiment has been described above, embodiments of the present disclosure can be implemented in, for example, exemplary embodiments as a system, an apparatus, a method, a program, and a storage medium. Specifically, the present disclosure can be applied to a system composed of a plurality of devices or to an apparatus composed of one device.

Additionally, all configurations obtained by combining the above exemplary embodiments are included in the present disclosure.

According to embodiments of the present disclosure, it is possible to, even in the case of performing the DNS name resolution with use of encrypted communication, detect a malicious program such as malware based on the DNS name resolution, and perform appropriate control associated with security measures with little effort. As a result, it is possible to increase security.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-174322, filed Oct. 6, 2023, which is hereby incorporated by reference herein in its entirety.

What is claimed is:

1. An image processing apparatus capable of performing Domain Name System (DNS) name resolution using encrypted communication, the image processing apparatus comprising:

one or more processors; and at least one memory storing executable instructions, which when executed by the one or more processors, cause the image processing apparatus to perform operations comprising:

monitoring communication data received from a network via an encrypted communication in accordance with a decryption process using a cryptographic key, when a request for name resolution is made from the image processing apparatus to the DNS via the encrypted communication;

detecting a failure in the name resolution based on contents of the communication data, which is a response from the DNS, as a result of the monitoring; and performing control associated with security measures based on a number of detections of failures in the name resolution.

2. The image processing apparatus according to claim 1, wherein, in a case where a predetermined number or more of failures in the name resolution is detected, the performing the control includes restricting execution of the name resolution as the control associated with the security measures.

3. The image processing apparatus according to claim 2, wherein restriction of the execution of the name resolution includes not performing the name resolution using communication that does not satisfy a predetermined condition.

4. The image processing apparatus according to claim 3, wherein communication that satisfies the predetermined condition includes at least one of DNS communication including a preliminarily registered Fully Qualified Domain Name (FQDN), DNS communication including a FQDN for which the name resolution has previously succeeded, DNS communication including a domain of the image processing apparatus, or DNS communication including a domain permitted in cross-origin resource sharing (CORS).

5. The image processing apparatus according to claim 1, wherein, in a case where a situation in which a predetermined number or more of failures in the name resolution is detected occurs a predetermined number of times, the performing the control includes performing processing of restoring a program to be used for an operation of the image processing apparatus as the control associated with the security measures.

6. The image processing apparatus according to claim 5, wherein the control associated with the security measures includes notification about suspected malware infection.

7. The image processing apparatus according to claim 1, wherein the DNS name resolution using the encrypted communication includes DNS name resolution using Domain Name System over Transport Layer Security (DOT), and wherein, in a case where the contents of the communication data indicate Transport Layer Security (TLS) communication and indicate communication with a specific port number, the detecting includes detecting whether the name resolution using the communication associated with the communication data has failed.

8. The image processing apparatus according to claim 1, wherein the DNS name resolution using the encrypted communication includes DNS name resolution using Domain Name System over Hypertext Transfer Protocol over Transport Layer Security (DoH), and wherein, in a case where the contents of the communication data indicate Hypertext Transfer Protocol over Transport Layer Security (HTTPS) communication and include application/dns-message as a content type that is interpretable as a response to the communication, the detecting includes detecting whether the name resolution using the communication associated with the communication data has failed.

9. A method for controlling an image processing apparatus capable of performing Domain Name System (DNS) name resolution using encrypted communication, the method comprising:

at the image processing apparatus:

monitoring communication data received from a network via an encrypted communication in accordance with a decryption process using a cryptographic key, when a request for name resolution is made from the image processing apparatus to the DNS via the encrypted communication;

detecting a failure in the name resolution based on contents of the communication data, which is a response from the DNS, as a result of the monitoring; and performing control associated with security measures based on a number of detections of failures in the name resolution.

10. A non-transitory computer-readable storage medium storing one or more programs including instructions which, when executed by one or more processors of an image processing apparatus capable of performing Domain Name System (DNS) name resolution using encrypted communication, cause the image processing apparatus to perform operations comprising:

monitoring communication data received from a network via an encrypted communication in accordance with a decryption process using a cryptographic key, when a request for name resolution is made from between an external system and the image processing apparatus to the DNS via the encrypted communication;

detecting a failure in the name resolution based on contents of the communication data, which is a response from the DNS, as a result of the monitoring; and performing control associated with security measures based on a number of detections of failures in the name resolution.

* * * * *